(12) United States Patent  (10) Patent No.: US 8,505,935 B2
Kim et al.  (45) Date of Patent: Aug. 13, 2013

(54) TRICYCLE KICK BOARD

(75) Inventors: Jung-Tae Kim, Seoul (KR); Seok-Jun Jung, Seoul (KR)

(73) Assignee: MSKI Corp. (KR)

( * ) Notice: Subject to any disclaimer, the term of this patent is extended or adjusted under 35 U.S.C. 154(b) by 156 days.

(21) Appl. No.: 12/810,537

(22) PCT Filed: Dec. 29, 2008

(86) PCT No.: PCT/KR2008/007760
§ 371 (c)(1),
(2), (4) Date: Sep. 23, 2010

(87) PCT Pub. No.: WO2009/091136
PCT Pub. Date: Jul. 23, 2009

(65) Prior Publication Data
US 2011/0031709 A1  Feb. 10, 2011

(30) Foreign Application Priority Data

Dec. 28, 2007 (KR) .................. 10-2007-0140901
Aug. 28, 2008 (KR) .................. 10-2008-0084236

(51) Int. Cl.
*B62M 1/12* (2006.01)
(52) U.S. Cl.
USPC .................. 280/62; 280/87.042; 280/87.05; 280/124.111

(58) Field of Classification Search
USPC .............................................. 280/62, 87.041
See application file for complete search history.

(56) References Cited

U.S. PATENT DOCUMENTS

| 6,554,302 | B1 | 4/2003 | Liu |
| 6,851,694 | B2 | 2/2005 | Feng |
| 7,549,655 | B2* | 6/2009 | Fan ..................... 280/87.041 |
| 2005/0001399 | A1* | 1/2005 | Yeo et al. ............ 280/87.041 |

FOREIGN PATENT DOCUMENTS

| JP | 2002-325878 A | 11/2002 |
| KR | 20-0405741 Y1 | 1/2006 |
| KR | 100613014 B1 | 8/2006 |
| KR | 10-2009-0063712 A | 6/2009 |

* cited by examiner

*Primary Examiner* — Jeffrey J Restifo
*Assistant Examiner* — Erez Gurari
(74) *Attorney, Agent, or Firm* — Harness, Dickey & Pierce, P.L.C.

(57) ABSTRACT

Disclosed is a tricycle kick board that includes a pillar shaft rotatably mounting a front wheel to a lower portion thereof, a steering unit mounted to a upper portion of the pillar shaft, a joint unit mounted to the pillar shaft, and left and right moving frames connected at one portion thereof to the joint unit and at another portion thereof to left and right foot rest assemblies, respectively, each of the left and right foot rest assemblies having a wheel disposed thereunder. The joint unit is provided with a main body fitted to the pillar shaft so as to be pivotable about the pillar shaft, a main shaft fastened to a side of the main body; and a supplementary body pivotally mounted to the main body so as to be pivotable about the main body.

16 Claims, 12 Drawing Sheets

TRICYCLE KICK BOARD

TECHNICAL FIELD

The present invention relates to tricycle kick boards, and more particularly to a tricycle kick board with an improved structure which allows the rider to arrive at his destination while minimizing the quantity of motion and taking safety into account.

BACKGROUND ART

In general, conventional kick boards are devices which include a foot rest plate of 50 cm mounting two wheel on a bottom surface thereof, in which the rider obtains driving force by kicking away the ground with one foot while putting the other foot on the foot rest plate.

The riders steer these kick boards by using a handle with a height of about 1 m or by keeping balance while putting both feet on the foot rest plate.

DISCLOSURE OF INVENTION

Technical Problem

The conventional kick boards above have a problem in that crashes and safety accident are frequently caused, since unskilled riders have a difficulty in keeping balance and stepping on the foot brake when he is travelling at high speed despite of the fact that the rider has to step on a foot brake while keeping his balance in order to stop the kick board.

Technical Solution

Accordingly, the present invention has been made to solve the above-mentioned problems occurring in the prior art, and the present invention provides a tricycle kick board which can enhance safety of the rider and provide the rider with exercise effect and enjoyment.

To accomplish the object, the present invention provides a tricycle kick board which comprises: a pillar shaft having a front wheel rotatably mounted to a lower portion thereof; a steering unit mounted to an upper portion of the pillar shaft; a joint unit disposed on the pillar shaft; and left and right moving frames connected at one portion thereof to the joint unit and at another portion thereof to left and right foot rest assemblies, respectively, each of the left and right foot rest assemblies having a wheel disposed thereunder, wherein the joint unit comprises: a main body fitted to the pillar shaft so as to be pivotable about the pillar shaft; a main shaft fastened to a side of the main body; and a supplementary body pivotally mounted to the main body so as to be pivotable about the main body.

To accomplish effects of the present invention, there is provided a first modified example of the tricycle kick board, in which it is efficient that the main body comprises: upper and lower bodies fitted to the pillar shaft and coupled to a top and bottom of the main body, respectively; upper and lower bearings fitted to the pillar shaft and disposed above and below the upper and lower bodies, respectively; and upper and lower fastening nuts disposed above and below the upper and lower bearings, respectively, the upper and lower fastening nuts being fastening with the pillar shaft.

To accomplish effects of the present invention, there is provided a second modified example of the tricycle kick board, in which it is efficient that the tricycle kick board further comprises: upper left and right compression springs mounted between the supplementary body and the upper body, the upper left and right compression springs being spaced apart from each other; and lower left and right compression springs mounted between the supplementary body and the lower body, the lower left and right compression springs being spaced apart from each other.

To accomplish effects of the present invention, there is provided a third modified example of the tricycle kick board, in which it is efficient that the tricycle kick board further comprises: upper and lower pin holes formed on the top and bottom surfaces of the main body, respectively; fastening guide protrusions disposed on a bottom surface of the upper body or on a top surface of the lower body and formed to correspond to the upper pin holes or the lower pin holes.

To accomplish effects of the present invention, there is provided a fourth modified example of the tricycle kick board, in which it is efficient that the upper body or the lower body is provided with upper right and left braces or lower right and left braces which are disposed on both of left and right sides thereof.

To accomplish effects of the present invention, there is provided a fifth modified example of the tricycle kick board, in which it is efficient that each of the lower right brace and the lower left brace is provided with a first spring guide protrusion, and each of the upper right brace and the upper left brace is provided with a second spring guide protrusion.

To accomplish effects of the present invention, there is provided a sixth modified example of the tricycle kick board, in which it is efficient that the supplementary body comprises: lower left and right support arms disposed on the left and right sides thereof, respectively; upper left and right support arms disposed on the left and right sides thereof, respectively, the upper left and right support arms being spaced apart from the lower left and right support arms; third and fourth fastening holes formed in the upper left and right support arms, respectively; and seventh and eighth fastening holes formed in the lower left and right support arms, respectively, the seventh and eighth fastening holes corresponding to the third and fourth fastening holes.

To accomplish effects of the present invention, there is provided a seventh modified example of the tricycle kick board, in which it is efficient that the left and right moving frames comprise: thirteenth fastening holes each formed therein; stopping jaws each formed therein and spaced apart from each of the thirteenth fastening holes; receiving grooves each formed between each of the left and right moving frames and each of the stopping jaws; a first shaft inserted and fastened into the third fastening hole, the seventh fastening hole, and one of the thirteenth fastening holes; a second shaft inserted and fastened into the fourth fastening hole, the eighth fastening hole, and another of the thirteenth fastening holes; and left and right buffer members secured between the upper and lower right support arms or the upper and lower left support arms, the left and right buffer members being disposed within the receiving grooves, respectively.

To accomplish effects of the present invention, there is provided an eighth modified example of the tricycle kick board, in which it is efficient that the tricycle kick board further comprises a left seat recess and a right seat recess formed on a top surface or a bottom surface of the supplementary body, respectively.

To accomplish effects of the present invention, there is provided a ninth modified example of the tricycle kick board, in which it is efficient that the tricycle kick board further comprises a third spring guide protrusion or a fourth spring guide protrusion disposed in the left seat recess or the right seat recess.

To accomplish effects of the present invention, there is provided a tenth modified example of the tricycle kick board, in which it is efficient that the supplementary body comprises: upper left and right bases or lower left and right bases formed on the top surface or bottom surface thereof, respectively; third spring guide protrusions disposed in the lower left and right bases, respectively; and fourth spring guide protrusions disposed in the upper left and right bases, respectively.

To accomplish effects of the present invention, there is provided an eleventh modified example of the tricycle kick board, in which it is efficient that each of the left and right foot rest assemblies comprises: a left and right direction pivoting unit connected thereto; a foot rest unit disposed to surround the left and right direction pivoting unit, the foot rest unit being pivoted left and right by the left and right direction pivoting unit; and a wheel unit disposed under the foot rest unit.

To accomplish effects of the present invention, there is provided a twelfth modified example of the tricycle kick board, in which it is efficient that the foot rest unit comprises: a first foot rest plate; a non-slip member disposed under the first foot rest plate; and a second foot rest plate disposed under the non-slip member, the second foot rest plate being coupled with the first foot rest plate while surrounding the non-slip member.

To accomplish effects of the present invention, there is provided a thirteenth modified example of the tricycle kick board, in which it is efficient that the left and right direction pivoting unit comprises: a connecting frame connected to each of the left and right moving frames in which a pivot shaft of the connecting frame is fastened between the non-slip member and the second foot rest plate so as to rotate the foot rest unit; first and second stopper protrusions disposed on both side portions of the connecting frame, the first and second stopper protrusions being adjacent to the pivot shaft; first and second stopper members fastened between the non-slip member and the second foot rest plate and spaced apart from the pivot shaft, the first or second stopper member being contacted with and stopped by the first or second stopper protrusion depending on pivotal directions of the foot rest unit; and a securing bracket disposed under the second foot rest plate, the securing bracket fastening the pivotal shaft and the first and second stopper members.

To accomplish effects of the present invention, there is provided a fourteenth modified example of the tricycle kick board, in which it is efficient that the first and second stopper members are made of urethane or soft rubber with a high friction co-efficient.

To accomplish effects of the present invention, there is provided a fifteenth modified example of the tricycle kick board, in which it is efficient that the wheel unit comprises: first and second wheel connecting frames disposed under the foot rest unit; one or more wheels mounted between the first and second wheel connecting frames; and a brake unit disposed between the first and second wheel connecting frames and spaced apart from the one or more wheels so as to brake the wheels.

To accomplish effects of the present invention, there is provided a sixteenth modified example of the tricycle kick board, in which it is efficient that the one or more wheels are directional caster wheels which are adapted to change direction by a certain degree when being applied with lateral force and to be restored to when the lateral force is removed.

To accomplish effects of the present invention, there is provided a seventeenth modified example of the tricycle kick board, in which it is efficient that the wheel unit comprises: first and second wheel connecting frames disposed under the foot rest unit; two or more wheels mounted between the first and second wheel connecting frames; and a brake unit disposed between the first and second wheel connecting frames and spaced apart from the two or more wheels so as to brake the one of the wheels.

Advantageous Effects

According to the tricycle kick board of the present invention as described above, there are following effects.

First, the tricycle kick board can enhance safety of the rider and provide the rider with exercise effect and enjoyment.

Second, the tricycle kick board can enhance reliability in relation to product safety, since the rider can stably travel while keeping balance.

Figure 1:
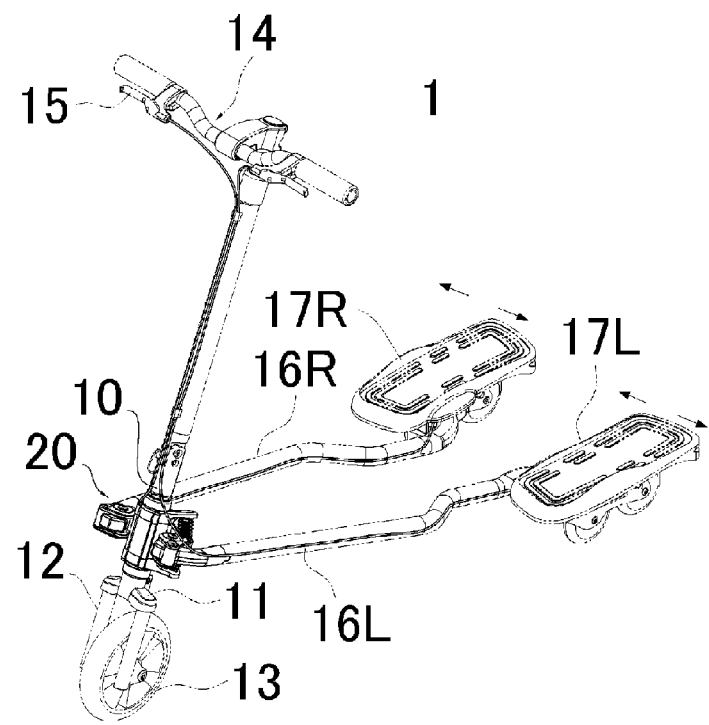
FIG. 1 is a view for illustrating a tricycle kick board according to an embodiment of the present invention.

1: tricycle kick board
*10: pillar shaft 11: securing cap
12: fork 13: front wheel
14: steering unit 15: brake control lever
16R, 16L: left and right moving frames
17R, 17L: left and right foot rest assembly
20: joint unit
21, 22: first and second joint groups
30: main body 31: first fitting hole
32T: fastening tap 33: main tap
35T: upper pin hole 35B: lower pin hole
40: lower body 41: second fitting hole
42: first fastening hole 43R: lower right brace
43L: lower left brace
44: first spring guide protrusion
45: fastening guide protrusion
50: upper body 51: third fitting hole 52: second fastening holes 53R: upper right brace
53L: upper left brace
54: second spring guide protrusion
55: fastening guide protrusion
60T: upper bearing 60B: lower bearing
61T: upper fastening nut 61B: lower fastening nut
62T: upper fastening bolt 62B: lower fastening bolt
70: supplementary body 71: main shaft hole
72R: lower right support arm
72L: lower left support arm
73R: upper right support arm
73L: upper left support arm
74a, 74b: first and second taps
75a, 75b: seventh and eighth fastening holes
76a, 76b: fifth and sixth fastening holes
77a, 77b: third and fourth fastening holes
78R: right seat recess 78L: left seat recess
90TR: upper right base 90TL: upper left base
90BR: lower right base 90BL: lower left base
91a: third spring guide protrusion
91b: fourth spring guide protrusion
92a, 92b, 92c, 92d: ninth, tenth, eleventh, and twelfth fastening holes
93TR: upper right compression spring
93TL: upper left compression spring
93BR: lower right compression spring
93BL: lower left compression spring
94R: right frame 94L: left frame
95: thirteenth fastening hole 96: stopping jaw
97: receiving groove
97a, 97b: first and second inner walls
98R: right buffer member 98L: left buffer member
99a, 99b: third and fourth bearings
100: bearing column 101: main shaft
102a, 102b: first and second fastening bolts
103a, 103b: first and second shafts
201: left and right direction pivoting unit
202: connecting frame 203: connecting frame hole
204: first stopper protrusion
206: second stopper protrusion
213: first bearing
215: second bearing 216: first stopper member
217: second stopper member 218: securing bracket
219: first fastening bolt 220: second fastening bolt
221: foot rest unit 222: first foot rest plate
222a: coupling slot 223: non-slip member
223a: coupling protrusion 224a: pivot shaft
224b: first supplementary pivot shaft
224c: second supplementary pivot shaft
225: second foot rest plate 226: boss
227: third fastening bolt 228: fourth fastening bolt
241: wheel unit
242: first wheel connecting frame
244: second wheel connecting frame
246: wheel
247, 248, 249: fastening means
250: brake unit 250a: stopper
250b: brake line collecting means
250c: torsion spring 250d: fastening pin
251: fifth fastening bolt

BEST MODE FOR CARRYING OUT THE INVENTION

Accordingly, the present invention has been made to solve the above-mentioned problems occurring in the prior art, and the present invention provides a tricycle kick board which can enhance safety of the rider and provide the rider with exercise effect and enjoyment.

To accomplish the object, the present invention provides a tricycle kick board which comprises: a pillar shaft having a front wheel rotatably mounted to a lower portion thereof; a steering unit mounted to an upper portion of the pillar shaft; a joint unit disposed on the pillar shaft; and left and right moving frames connected at one portion thereof to the joint unit and at another portion thereof to left and right foot rest assemblies, respectively, each of the left and right foot rest assemblies having a wheel disposed thereunder, wherein the joint unit comprises: a main body fitted to the pillar shaft so as to be pivotable about the pillar shaft; a main shaft fastened to a side of the main body; and a supplementary body pivotally mounted to the main body so as to be pivotable about the main body.

To accomplish effects of the present invention, there is provided a first modified example of the tricycle kick board, in which it is efficient that the main body comprises: upper and lower bodies fitted to the pillar shaft and coupled to a top and bottom of the main body, respectively; upper and lower bearings fitted to the pillar shaft and disposed above and below the upper and lower bodies, respectively; and upper and lower fastening nuts disposed above and below the upper and lower bearings, respectively, the upper and lower fastening nuts being fastening with the pillar shaft.

To accomplish effects of the present invention, there is provided a second modified example of the tricycle kick board, in which it is efficient that the tricycle kick board further comprises: upper left and right compression springs mounted between the supplementary body and the upper body, the upper left and right compression springs being spaced apart from each other; and lower left and right compression springs mounted between the supplementary body and the lower body, the lower left and right compression springs being spaced apart from each other.

To accomplish effects of the present invention, there is provided a third modified example of the tricycle kick board, in which it is efficient that the tricycle kick board further comprises: upper and lower pin holes formed on the top and bottom surfaces of the main body, respectively; fastening guide protrusions disposed on a bottom surface of the upper body or on a top surface of the lower body and formed to correspond to the upper pin holes or the lower pin holes.

To accomplish effects of the present invention, there is provided a fourth modified example of the tricycle kick board, in which it is efficient that the upper body or the lower body is provided with upper right and left braces or lower right and left braces which are disposed on both of left and right sides thereof.

To accomplish effects of the present invention, there is provided a fifth modified example of the tricycle kick board, in which it is efficient that each of the lower right brace and the lower left brace is provided with a first spring guide protrusion, and each of the upper right brace and the upper left brace is provided with a second spring guide protrusion.

To accomplish effects of the present invention, there is provided a sixth modified example of the tricycle kick board, in which it is efficient that the supplementary body comprises: lower left and right support arms disposed on the left and right sides thereof, respectively; upper left and right support arms disposed on the left and right sides thereof, respectively, the upper left and right support arms being spaced apart from the lower left and right support arms; third and fourth fastening holes formed in the upper left and right support arms, respectively; and seventh and eighth fastening holes formed in the lower left and right support arms, respectively, the seventh and eighth fastening holes corresponding to the third and fourth fastening holes.

To accomplish effects of the present invention, there is provided a seventh modified example of the tricycle kick board, in which it is efficient that the left and right moving frames comprise: thirteenth fastening holes each formed therein; stopping jaws each formed therein and spaced apart from each of the thirteenth fastening holes; receiving grooves each formed between each of the left and right moving frames and each of the stopping jaws; a first shaft inserted and fastened into the third fastening hole, the seventh fastening hole, and one of the thirteenth fastening holes; a second shaft inserted and fastened into the fourth fastening hole, the eighth fastening hole, and another of the thirteenth fastening holes; and left and right buffer members secured between the upper and lower right support arms or the upper and lower left support arms, the left and right buffer members being disposed within the receiving grooves, respectively.

To accomplish effects of the present invention, there is provided an eighth modified example of the tricycle kick board, in which it is efficient that the tricycle kick board further comprises a left seat recess and a right seat recess formed on a top surface or a bottom surface of the supplementary body, respectively.

To accomplish effects of the present invention, there is provided a ninth modified example of the tricycle kick board, in which it is efficient that the tricycle kick board further comprises a third spring guide protrusion or a fourth spring guide protrusion disposed in the left seat recess or the right seat recess.

To accomplish effects of the present invention, there is provided a tenth modified example of the tricycle kick board, in which it is efficient that the supplementary body comprises: upper left and right bases or lower left and right bases formed on the top surface or bottom surface thereof, respectively; third spring guide protrusions disposed in the lower left and right bases, respectively; and fourth spring guide protrusions disposed in the upper left and right bases, respectively.

To accomplish effects of the present invention, there is provided an eleventh modified example of the tricycle kick board, in which it is efficient that each of the left and right foot rest assemblies comprises: a left and right direction pivoting unit connected thereto; a foot rest unit disposed to surround the left and right direction pivoting unit, the foot rest unit being pivoted left and right by the left and right direction pivoting unit; and a wheel unit disposed under the foot rest unit.

To accomplish effects of the present invention, there is provided a twelfth modified example of the tricycle kick board, in which it is efficient that the foot rest unit comprises: a first foot rest plate; a non-slip member disposed under the first foot rest plate; and a second foot rest plate disposed under the non-slip member, the second foot rest plate being coupled with the first foot rest plate while surrounding the non-slip member.

To accomplish effects of the present invention, there is provided a thirteenth modified example of the tricycle kick board, in which it is efficient that the left and right direction pivoting unit comprises: a connecting frame connected to each of the left and right moving frames in which a pivot shaft of the connecting frame is fastened between the non-slip member and the second foot rest plate so as to rotate the foot rest unit; first and second stopper protrusions disposed on both side portions of the connecting frame, the first and second stopper protrusions being adjacent to the pivot shaft; first and second stopper members fastened between the non-slip member and the second foot rest plate and spaced apart from the pivot shaft, the first or second stopper member being contacted with and stopped by the first or second stopper protrusion depending on pivotal directions of the foot rest unit; and a securing bracket disposed under the second foot rest plate, the securing bracket fastening the pivotal shaft and the first and second stopper members.

To accomplish effects of the present invention, there is provided a fourteenth modified example of the tricycle kick board, in which it is efficient that the first and second stopper members are made of urethane or soft rubber with a high friction co-efficient.

To accomplish effects of the present invention, there is provided a fifteenth modified example of the tricycle kick board, in which it is efficient that the wheel unit comprises: first and second wheel connecting frames disposed under the foot rest unit; one or more wheels mounted between the first and second wheel connecting frames; and a brake unit disposed between the first and second wheel connecting frames and spaced apart from the one or more wheels so as to brake the wheels.

To accomplish effects of the present invention, there is provided a sixteenth modified example of the tricycle kick board, in which it is efficient that the one or more wheels are directional caster wheels which are adapted to change direction by a certain degree when being applied with lateral force and to be restored to when the lateral force is removed.

To accomplish effects of the present invention, there is provided a seventeenth modified example of the tricycle kick board, in which it is efficient that the wheel unit comprises: first and second wheel connecting frames disposed under the foot rest unit; two or more wheels mounted between the first and second wheel connecting frames; and a brake unit disposed between the first and second wheel connecting frames and spaced apart from the two or more wheels so as to brake the one of the wheels.

Mode for the Invention

Hereinafter, exemplary embodiments of the present invention will be described in greater detail with reference to the accompanying drawings.

<Embodiments>

FIG. 1 is a view of a tricycle kick board according to an embodiment of the present invention.

As shown in FIG. 1, the tricycle kick board 1 according to an embodiment of the present invention includes a pillar shaft 10 which has a front wheel 13 pivotally connected to a lower portion thereof. A steering unit 14 is disposed at an upper portion of the pillar shaft 10. A joint unit 20 is disposed at a lower portion of the pillar shaft 10. A pair of left and right foot rest assemblies 17L and 17R are connected to the joint unit 20.

The front wheel 13 is mounted to a fork 12 mounted to a securing cap 11 which is mounted at the lower end of the pillar shaft 10.

In addition, the pillar shaft 10 may be configured to be foldable. The foldable configuration is not a chief concept of the present invention and details thereof are omitted herein.

The steering unit 14 may be configured to be a handle of a common bicycle and may further be provided with a brake control lever 15.

The brake control lever 15 is connected with a wire to transmit the power thereof.

Brake members 150 which are organically operated with the brake control lever 15 are disposed in the pair of left and right foot rest assemblies 17L and 17R in which the braking power thereof is transmitted through wires to the wheels of the pair of left and right foot rest assemblies 17L and 17R to brake them.

The joint unit 20 is configured in such a manner that the pair of left and right foot rest assemblies 17L and 17R can rotate clockwise or counter clockwise as viewed from the front of the tricycle kick board 1 and can be returned back to an initial position when an artificial external force is removed.

The joint unit 20 is further configured in such a manner that the left foot rest assembly 17L and the right foot rest assembly 17R can be opened out in left and right directions, respectively, and can be returned back to an initial position.

Especially, each of the foot rest assemblies can be independently moved since the motive power is not transmitted to the right foot rest assembly 17R while the left foot rest assembly is opened out or returned back and vice versa.

In this way, the joint unit 20 of the tricycle kick board 1 according to an embodiment of the present invention can be freely moved in arbitrary directions, details of which will be described below.

Hereinafter, the joint unit 20 that can be applied to the tricycle kick board according to an embodiment of the present invention is explained with reference to FIGS. 2 and 3.

Figure 2:
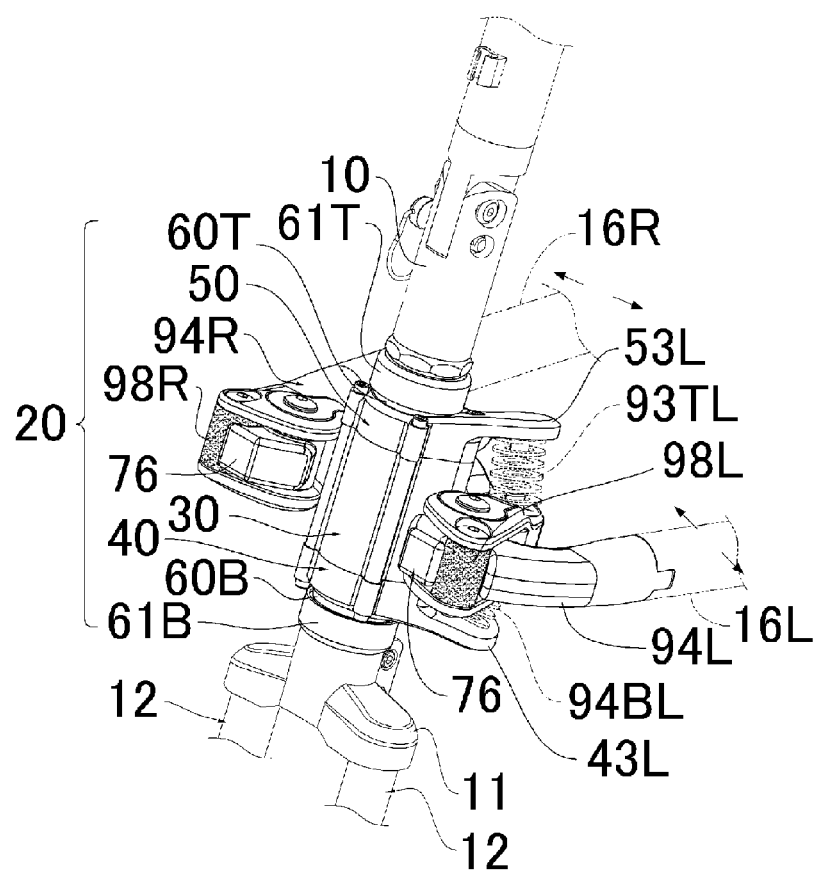
FIGS. 2 and 3 are views for illustrating an example of a joint unit of the tricycle kick board according to an embodiment of the present invention.
Figure 3:
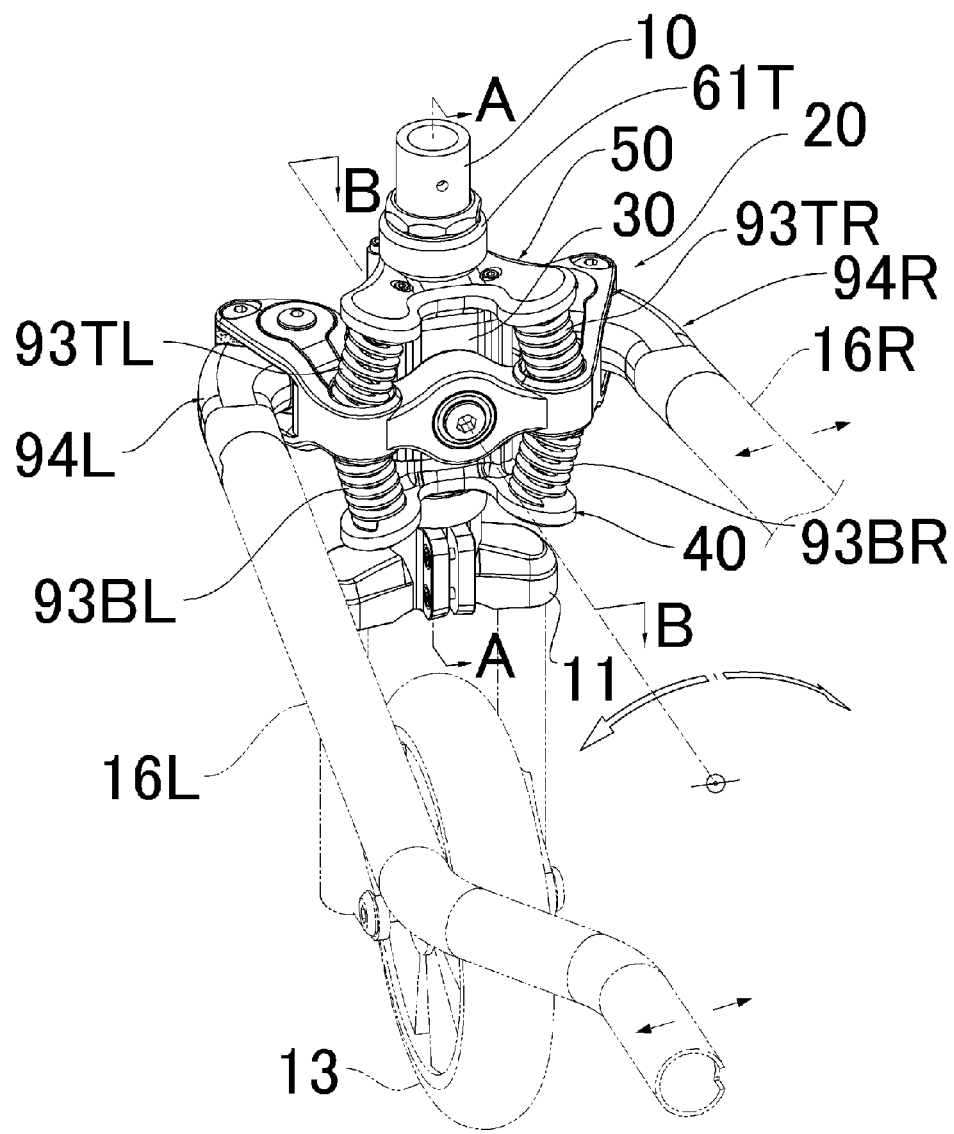

FIGS. 2 and 3 are front and rear perspective views of an example of the tricycle kick board 1 according to an embodiment of the present invention.

As shown in FIGS. 2 and 3, the joint unit 20 of the tricycle kick board 1 according to an embodiment of the present invention includes a main body 30 pivotally mounted to the pillar shaft 10, a supplementary body 70 pivotally mounted at the rear of the main body 30, and left and right frames 94L and 94R pivotally connected to the supplementary body 70.

There are disposed left and right moving frames 16L and 16R which are extended from the left and right frames 94L and 94R, respectively.

Further, the left and right foot rest assemblies 17L and 17R are mounted to the left and right moving frames 16L and 16R, respectively.

The main body 30 pivotally mounted to the pillar shaft 10 is explained with reference to FIGS. 4, 6, and 7 below.

Figure 4:
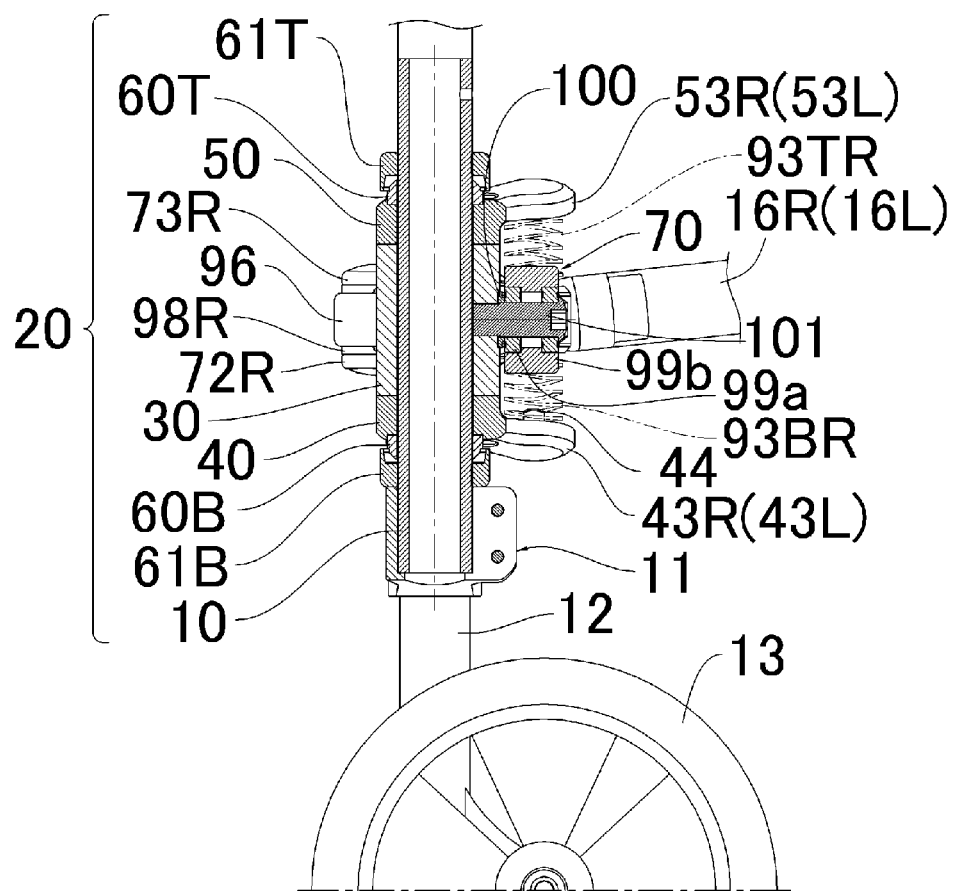
FIG. 4 is a sectional view along line A-A of FIG. 3 for illustrating an example of a joint unit of the tricycle kick board according to an embodiment of the present invention.

FIG. 4 is a sectional view along line A-A of FIG. 3, which represents the example of the joint unit 20 applied to the tricycle kick board 1 according to an embodiment of the present invention. FIG. 6 is an exploded view of the example of the joint unit 20 applied to the tricycle kick board 1 according to an embodiment of the present invention. FIG. 7 shows a more detailed exploded view of the joint unit of FIG. 6.

Figure 6:
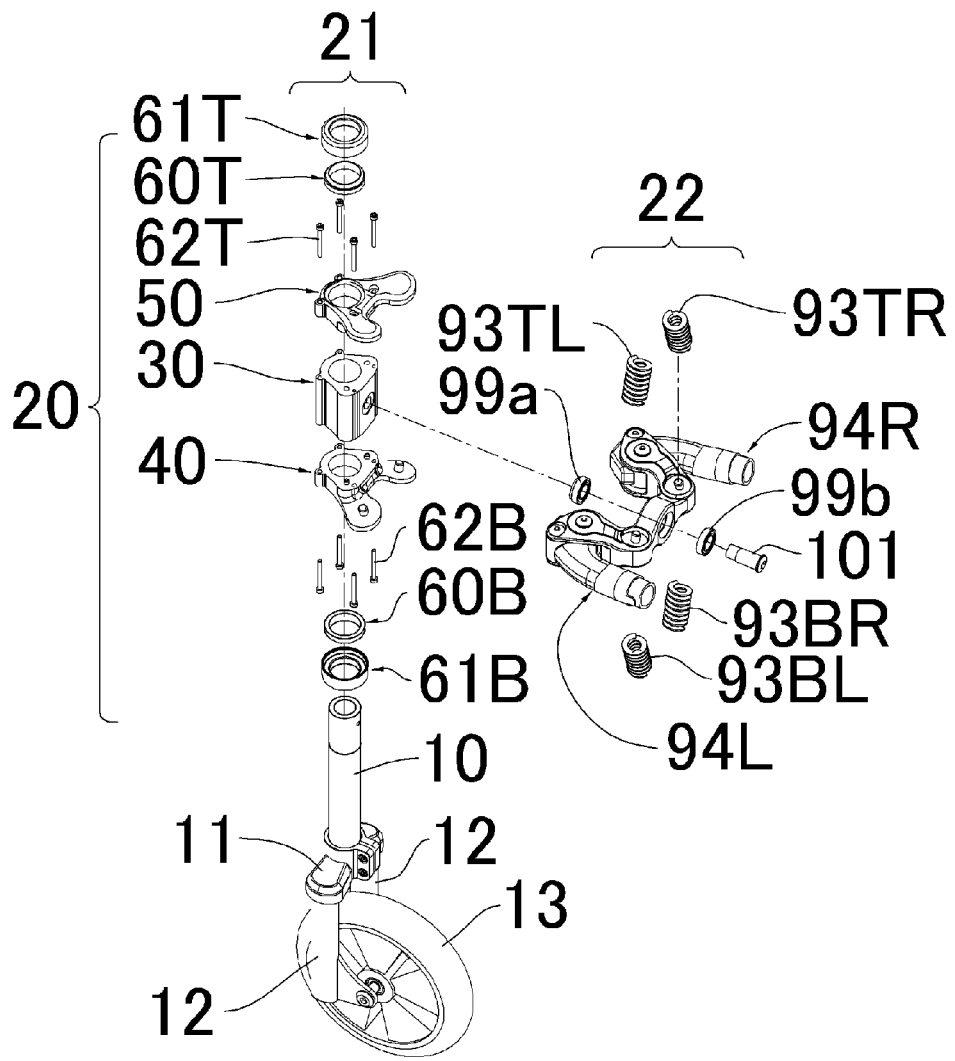
FIG. 6 is an exploded view for illustrating an example of the joint unit of the tricycle kick board according to an embodiment of the present invention.
Figure 7:
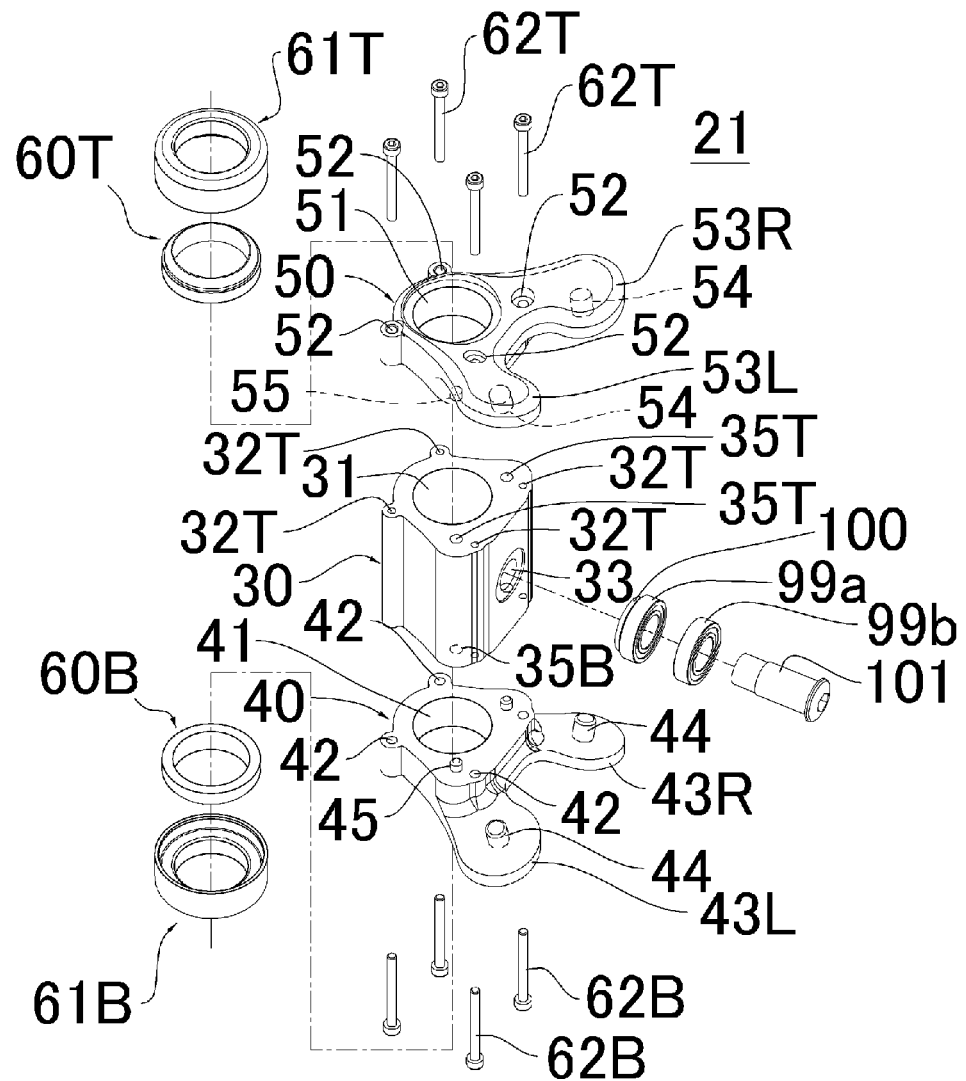
FIGS. 7 and 8 are exploded views for illustrating the joint unit of FIG. 6 in greater detail.
Figure 8:
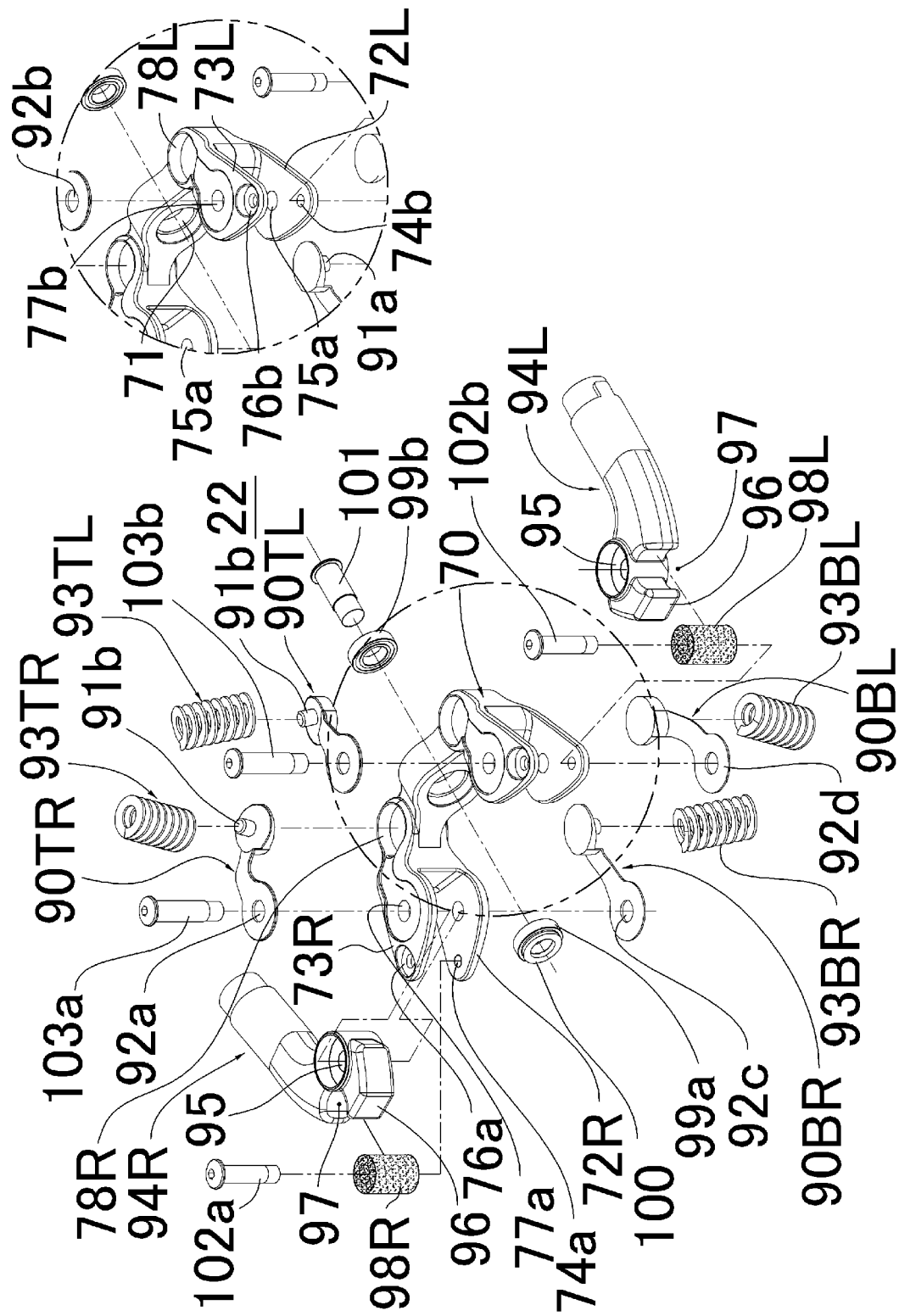

Especially, the joint unit 20 of FIG. 6 is divided into two groups, i.e., first and second groups 21 and 22 for explanation convenience, and FIGS. 7 and 8 are more detailed views of the first and second groups 21 and 22.

In the pillar shaft 10, there are fitted a lower fastening nut 61B, a lower bearing 60B, a lower body 40, the main body 30, an upper body 50, an upper bearing 60T, and an upper fastening nut 61T which are sequentially disposed above the securing cap 11.

Especially, the lower fastening nut 61B and the upper fastening nut 61T are fastened to the pillar shaft 10 so as to prevent the upper body 50, the main body 30, and the lower body 40 from being unintentionally detached.

Further, the upper bearing 60T and the lower bearing 60B allow the upper body 50, the main body 30, and the lower body 40 to freely pivot on the pillar shaft 10.

As detailed in FIG. 7, the main body 30 has a first fitting hole 31 and fastening taps 32T formed in a direction parallel to the first fitting hole 31 in which the fastening taps 32T may be penetration holes or holes of a predetermined depth.

Especially, if the fastening taps 32T are formed as the holes of a predetermined depth in the main body 30, the holes may be formed as symmetrical holes on the top and bottom surfaces of the main body 30.

In addition, upper and lower pin holes 35T and 35B may be formed on the top and bottom surfaces of the main body 30, respectively.

Further, a main tap 33 is formed on a lateral surface of the main body 30, in which the lateral surface side as viewed from the top of the main body 30 may have a width lager than that of the other side whereby the main tap 33 can be formed to have a longer length.

That is, the longer length allows the main tap 33 to be closely and strictly fitted with a main shaft 101 described below.

The lower body 40 and the upper body 50 may have configurations symmetrical to each other as viewed from the side thereof.

The lower body 40 has a second fitting hole 41 formed in the center thereof and first fastening holes 42 formed at points corresponding to those of the fastening taps 32T of the main body 30.

Further, the lower body 40 has, on the top surface thereof, fastening guide protrusions 45 disposed at points corresponding to those of the lower pin holes 35B of the main body 30.

The fastening guide protrusions 45 serve as guides to allow an assembling position to be more easily set when the main body 30 and the lower body 40 are assembled together.

Further, the lower body 40 has lower right and left braces 43L and 43R formed to be extended rearward.

The lower right and left braces 43L and 43R may have a respective first spring guide protrusion 44 on the top surfaces thereof, respectively, or may have, though not detailed, a seat recess capable of receiving a lower right compression spring 93BR and a lower left compression spring 93BL, respectively.

The first spring guide protrusions 44 restrain the lower right compression spring 93BR and the lower left compression spring 93BL from being unintentionally detached or removed.

The configuration of the upper body 50 is identical to that of the lower body 40, so that these are symmetrical configurations opposed to each other.

Therefore, the same details of the upper body 50 as the lower body 40 are omitted since these can be easily appreciated from the description of the lower body 40.

The lower body 40 or the upper body 50 is placed on the main body 30 and is then combined with the main body 30 by screwing lower fastening bolts 62B or upper fastening bolts 62T though the first fastening holes 42 or second fastening holes 52 into the fastening taps 32T.

That is, the lower body 40 or the upper body 50 is fixed and mounted by the lower fastening bolts 62B or the upper fastening bolts 62T to the main body 30.

The pivotal mounting of the supplementary body 70 on the rear of the main body 30 is explained with reference to FIGS. 5, 6, and 8.

The main shaft 101 is fastened and fixed into the main tap 33 formed in the lateral surface of the main body 30, and the supplementary body 70 is then pivotally mounted on the main shaft 101.

The supplementary body 70 has, in the center thereof, a main shaft hole 71. A plurality of bearings such as third and fourth bearings 99a and 99b are mounted so that the supplementary body 70 can more smoothly rotated on the main shaft 101.

In addition, a bearing column 100 may be disposed in the outside of the third bearing 99a disposed in a main body side, in which the bearing column 100 prevents the third bearing 99a from being unintentionally separated within the supplementary body 70.

A means for prevention of screw loosening may be provided to prevent the main shaft 101 from being unintentionally loosed from the main body 30 after being fastened.

The means for prevention of screw loosening may be achieved either by welding the main shaft 101 to the main body 30 at the inside of the first fitting hole 31 of the main body 30 so as to be permanently fixed or by inserting a pin into the main shaft 101 and the main body 30.

Further, the main shaft 101 may be fixed to the main body 30 while an adhesive is applied to the threaded portion of the main shaft 101.

The pivotal mountings of the left and right frames 94L and 94R are illustrated with reference to FIGS. 5 and 8.

The left and right frames 94L and 94R are mounted on the left and right sides of the supplementary body 70, respectively, so that the mounted frames are symmetrical to each other in reference to the main shaft 101 as viewed from the top of the supplementary body 70.

The supplementary body 70 has, on the top surface thereof, a right seat recess 78R and a left seat recess 78L, respectively, and the supplementary body 70 has, on the bottom surface thereof though not shown, other seat recesses symmetrical to the right seat recess 78R and the left seat recess 78L.

Further, spring guide protrusions may be directly formed in the right and left seat recesses 78R and 78L, respectively.

Further, the supplementary body 70 has a lower right support arm 72R and a lower left support arm 72L which are symmetrical to each other as viewed from the front of the supplementary body 70.

In addition, the supplementary body 70 is provided with an upper right support arm 73R spaced apart from the lower right support arm 72R at a vertical distance and is provided with an upper left support arm 73L spaced apart from the lower left support arm 72L at a vertical distance.

The upper right and left support arms 73R and 73L have a third fastening hole 77a and a fourth fastening hole 77b, respectively, which are vertically formed.

Further, the lower right and left support arms 72R and 72L have a seventh fastening hole 75a and an eighth fastening hole 75b which correspond to the third and fourth fastening holes 77a and 77b, respectively.

The seventh and eighth fastening holes 75a and 75b may have a respective tap such as a female screw formed therein.

In addition, the upper right and left support arms 73R and 73L have a fifth fastening hole 76a and a sixth fastening hole 76b, respectively, which are vertically formed at outside points of the third and fourth fastening holes 77a and 77b.

The lower right and left support arms 72R and 72L have a first tap 74a and a second tap 74b which are formed to correspond to the fifth and sixth fastening holes 76a and 76b, respectively.

Additional upper right and left bases 90TR and 90TL may be further arranged on the top of the supplementary body 70, and additional lower right and left bases 90BR and 90BL may be further arranged on the bottom of supplementary body 70.

The upper and lower right bases 90TR and 90BR and the upper and lower left bases 90TL and 90BL are symmetrical to each other.

That is, the upper left base 90TL and the lower right base 90BR are identical and opposed to each other.

The upper right and left bases 90TR and 90TL and the lower right and left bases 90BR and 90BL may have a third spring guide protrusions 91a and 91b formed on outside surfaces thereof, respectively.

The third spring guide protrusions 91a are inserted into the upper right compression spring 93TR and the upper left compression spring 93TL, respectively, so as to prevent unintentional detachment.

The upper right compression spring 93TR, the upper left compression spring 93TL, the lower right compression spring 93BR, and the lower left compression spring 93BL may be referred as to several compression springs for illustrating convenience.

The fourth spring guide protrusions 91b are inserted into the lower right compression spring 93BR and the lower left compression spring 93BL, respectively, so as to prevent them from unintentionally escaping.

Figure 9:
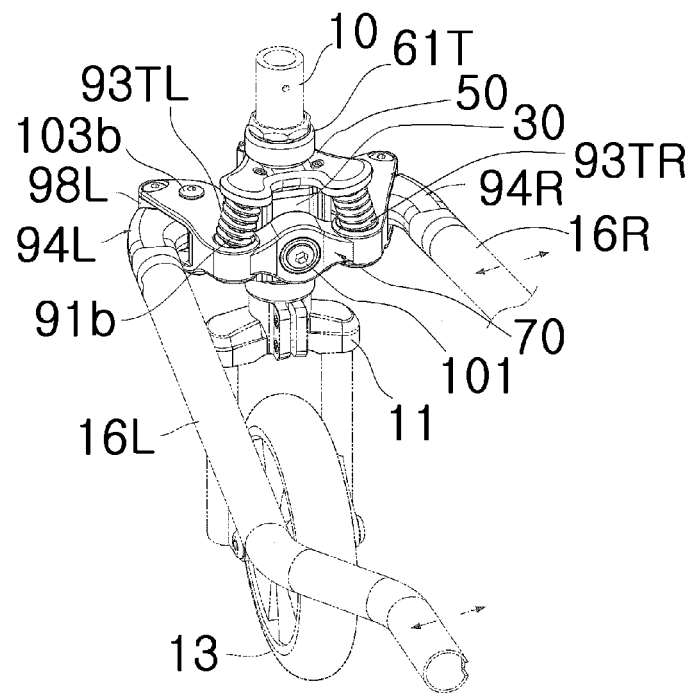
FIG. 9 is a view for illustrating an other example of a joint unit of the tricycle kick board according to an embodiment of the present invention.

Meanwhile, as shown in FIGS. 3 and 9, the upper right and left compression springs 93TR and 93TL may be inclined to be in the form of a trapezoid as viewed from the front or rear.

Figure 10:
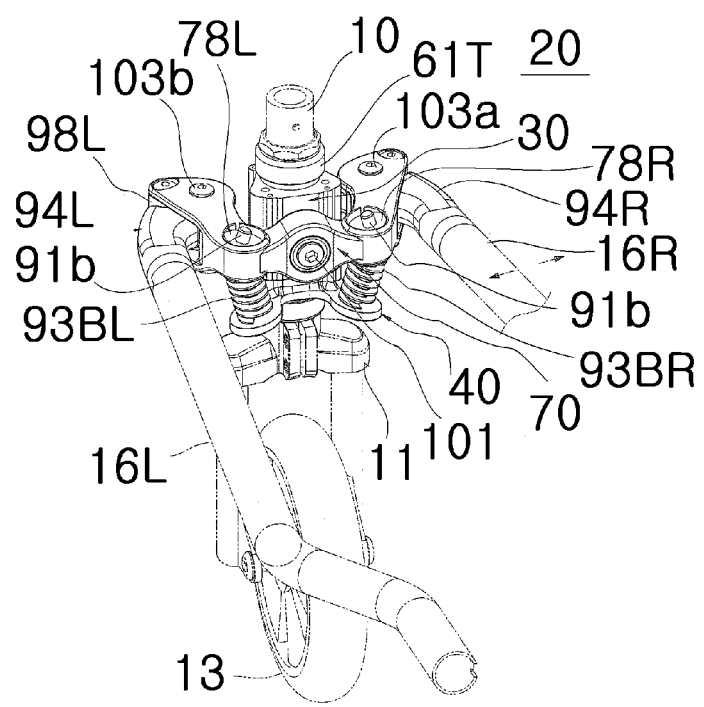
FIG. 10 is view for illustrating an another example of a joint unit of the tricycle kick board according to an embodiment of the present invention.

On the other hand, as shown in FIGS. 3 and 10, the lower right and left compression springs 93BR and 93BL may be inclined to be in the form of an inverted trapezoid as viewed from the front or rear.

That is, the upper right compression spring 93TR and the lower left compression spring 93BL may be disposed parallel to each other, and the upper left compression spring 93TL and the lower right compression spring 93BR may be disposed parallel to each other.

As mentioned above, the upper right and left compression springs 93TR and 93TL are disposed in the form of a trapezoid, the lower right and left compression springs 93BR and 93BL are disposed in the form of an inverted trapezoid.

These forms of a trapezoid or inverted trapezoid allow stresses to be applied to several compression springs in the longitudinal directions thereof when the supplementary body 70 is rotated about the main shaft 101.

Hence, although the supplementary body 70 is irregularly rotated on the main body 30 in travelling, several compression springs can actively cope with that.

Further, the upper right base 90TR, the upper left base 90TL, the lower right base 90BR, and the lower left base 90BL have ninth, tenth, eleventh, and twelfth fastening holes 92a, 92b, 92c, and 92d formed therein, respectively. The ninth, tenth, eleventh, and twelfth fastening holes 92a, 92b, 92c, and 92d may be disposed to correspond to the third and fourth fastening holes 77a and 77b.

That is, the upper right base 90TR, the upper left base 90TL, the lower right base 90BR, and the lower left base 90BL are made of a material different from that of the supplementary body 70, so that it may provide the feel of a different material and shape and an enhanced three-dimensional effect when they are assembled with the supplementary body 70.

The right frame 94R is mounted between the upper right support arm 73R and the lower right support arm 72R.

The right frame 94R has a thirteenth fastening hole 95 vertically formed and a stopping jaw 96 disposed at the front outside of the thirteenth fastening hole 95, and the receiving groove 97 formed between the stopping jaw 96 and the front end of the right frame 94R.

That is, the right frame 94R is inserted between the upper right support arm 73R and lower right support arm 72R so that the thirteenth fastening hole 95 is aligned with the third fastening hole 77a and the seventh fastening hole 75a. Thereafter, a first shaft 103a is inserted into the third fastening hole 77a.

Further, the first shaft 103a may be fixed into the seventh fastening hole 75a by interference fit of the end portion thereof into the seventh fastening hole 75a.

Further, the first shaft 103a may have an external screw portion at the end thereof and the seventh fastening hole 75a has a tap formed therein, so that the first shaft 103a may be threadedly fastened into the third fastening hole 77a.

Further, the first shaft 103a may have an external screw portion at the end thereof and an additional nut may be provided on the outside of the seventh fastening hole, so that the first shaft 103a may be threadedly fastened with the additional nut.

On the other hand, the left frame 94L has a configuration symmetrical to that of the right frame 94R and is readily appreciated. Therefore, the details thereof are omitted.

A right buffer member 98R is mounted in the front of the right frame 94R.

The right buffer member 98R may be made of a material with high shock absorption efficiency, such as rubber or urethane and may be a pipe.

That is, the right buffer member 98R is inserted between the upper right support arm 73R and the lower right support arm 72R so that it aligns with the fifth fastening hole 76a and the first tap 74a. A first fastening bolt 102a is inserted into the fifth fastening hole 76a and threadedly fastened into the first tap 74a.

Figure 5:
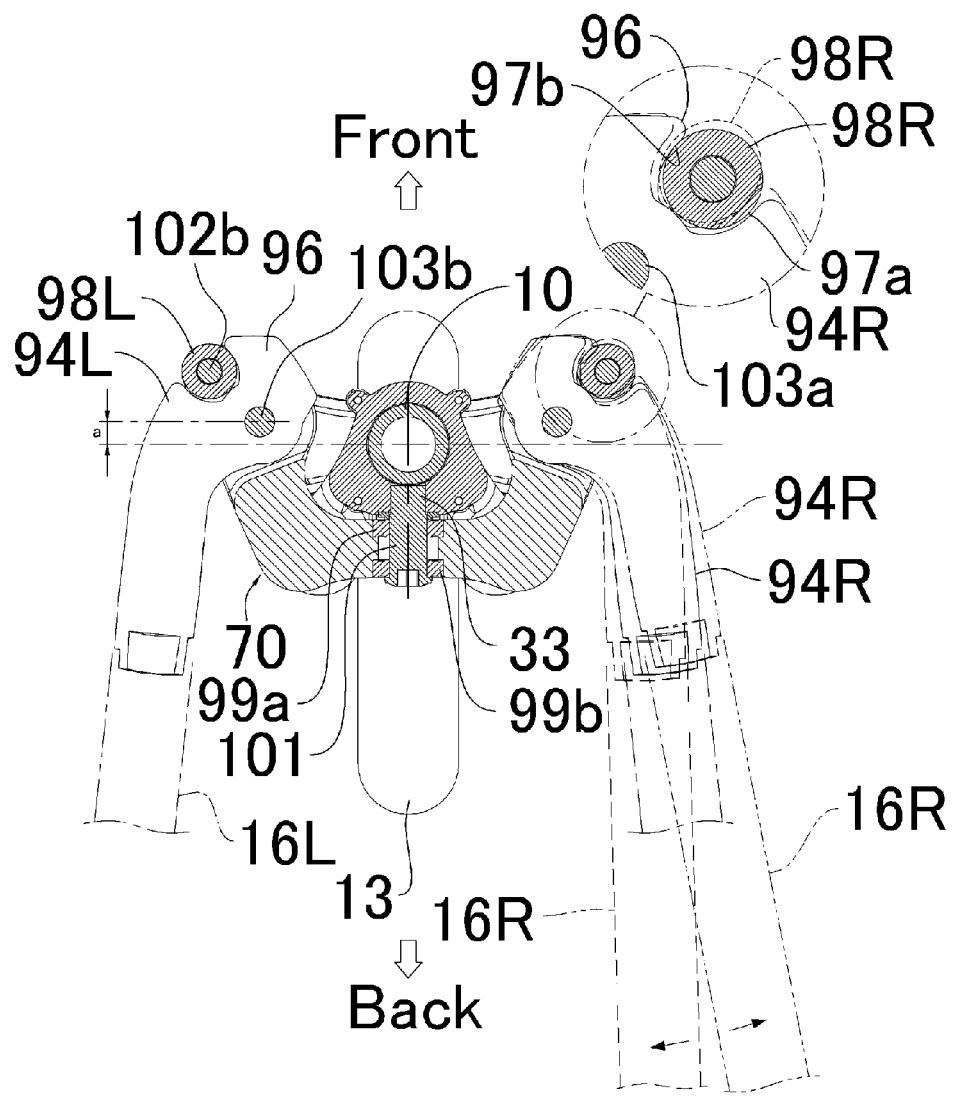
FIG. 5 is a sectional view along line B-B of FIG. 3 for illustrating an example of the joint unit of the tricycle kick board according to an embodiment of the present invention.

Further, the right buffer member 98R may be disposed to be received within the receiving groove 97 as described in FIG. 5.

It is noticed that, although FIG. 7 illustrates an example wherein the upper body 50 and the lower body 40 are respectively assembled onto the top and bottom of the main body 30 which can be applied to the present invention, the present invention is not limited to this configuration.

For example, although the upper body 50 and the lower body 40 of FIG. 7 are assembled onto the top and bottom of the main body 30, respectively, it is also possible that the upper body 50 may be only assembled with the main body 30, such as in FIG. 9, or the lower body 40 may be only assembled with the main body 30, such as in FIG. 10.

That is, the example of FIG. 9 has a restoring force which is developed by the upper right compression spring 93TR and the upper left compression spring 93 TL when the supplementary body 70 is restored to an initial even position.

The example of FIG. 10 has a restoring force which is developed by the lower right compression spring 93BR and the lower left compression spring 93BL when the supplementary body 70 is restored to the initial even position.

Figure 11:
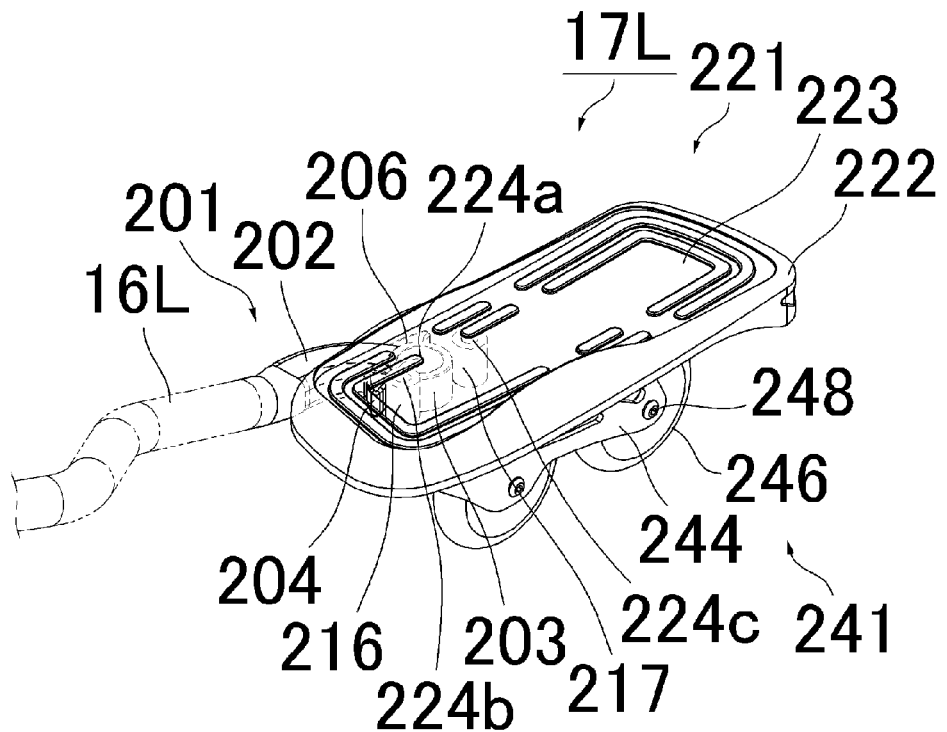
FIGS. 11 and 12 are views for illustrating a left foot rest assembly of the tricycle kick board according to an embodiment of the present invention.
Figure 12:
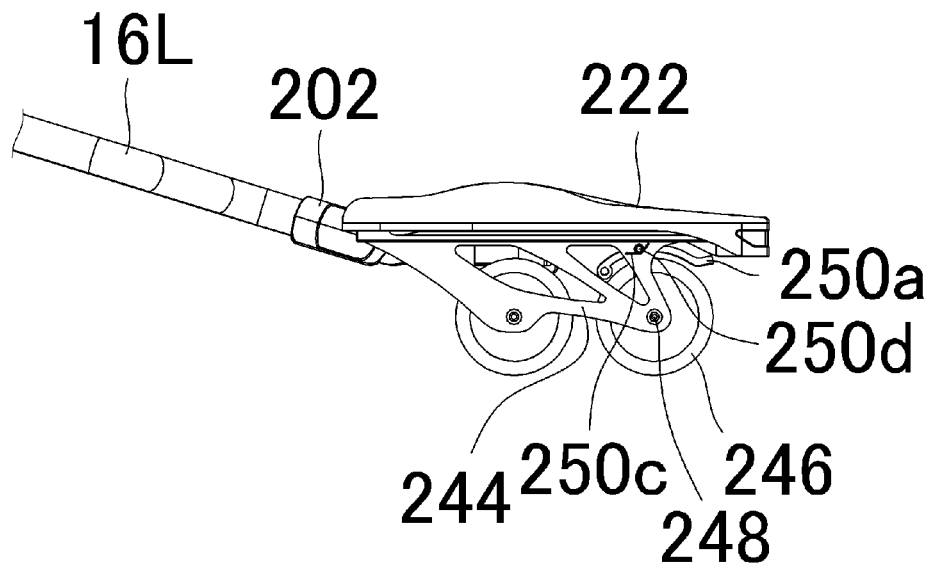
Figure 13:
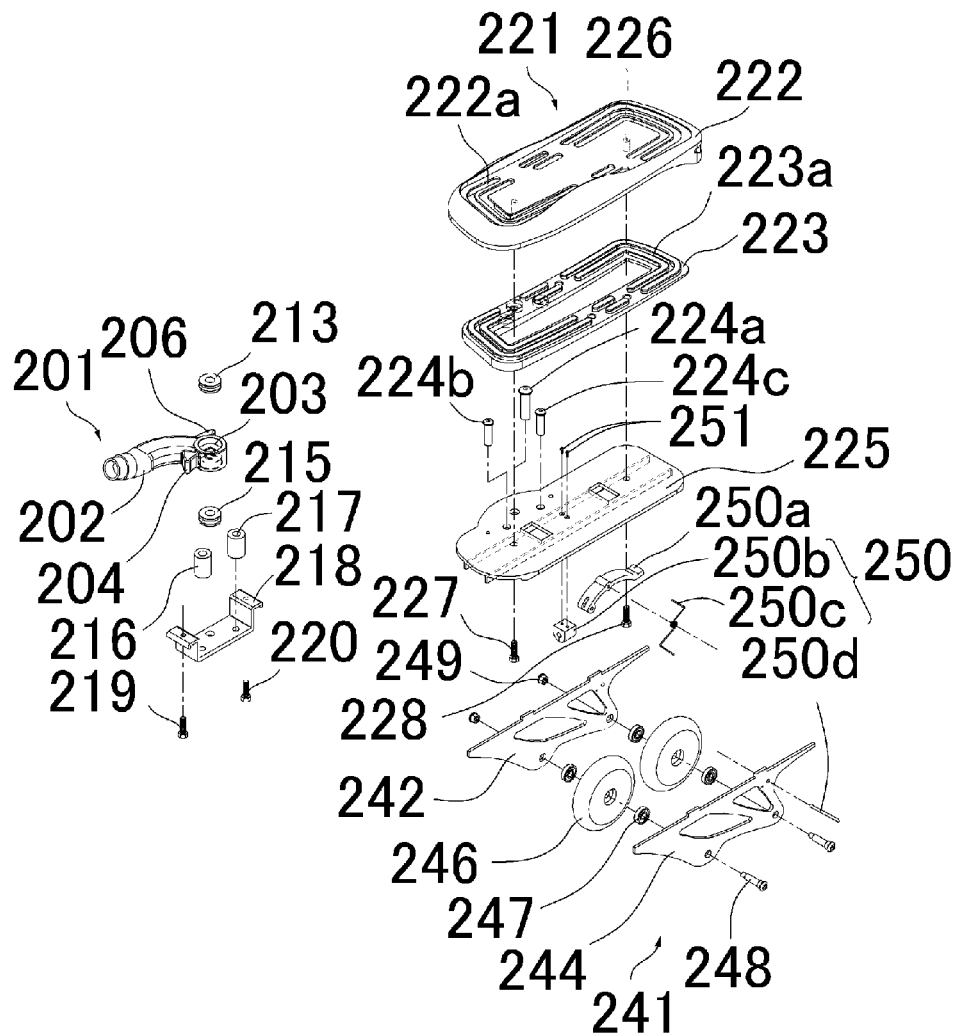
FIG. 13 is a exploded view for illustrating a left foot rest assembly of the tricycle kick board according to an embodiment of the present invention.

FIGS. 11 and 12 illustrate an example of the left foot rest assembly of the tricycle kick board according to an embodiment of the present invention. FIG. 13 is an exploded view of an example of the left foot rest assembly of the tricycle kick board according to an embodiment of the present invention.

Figure 14:
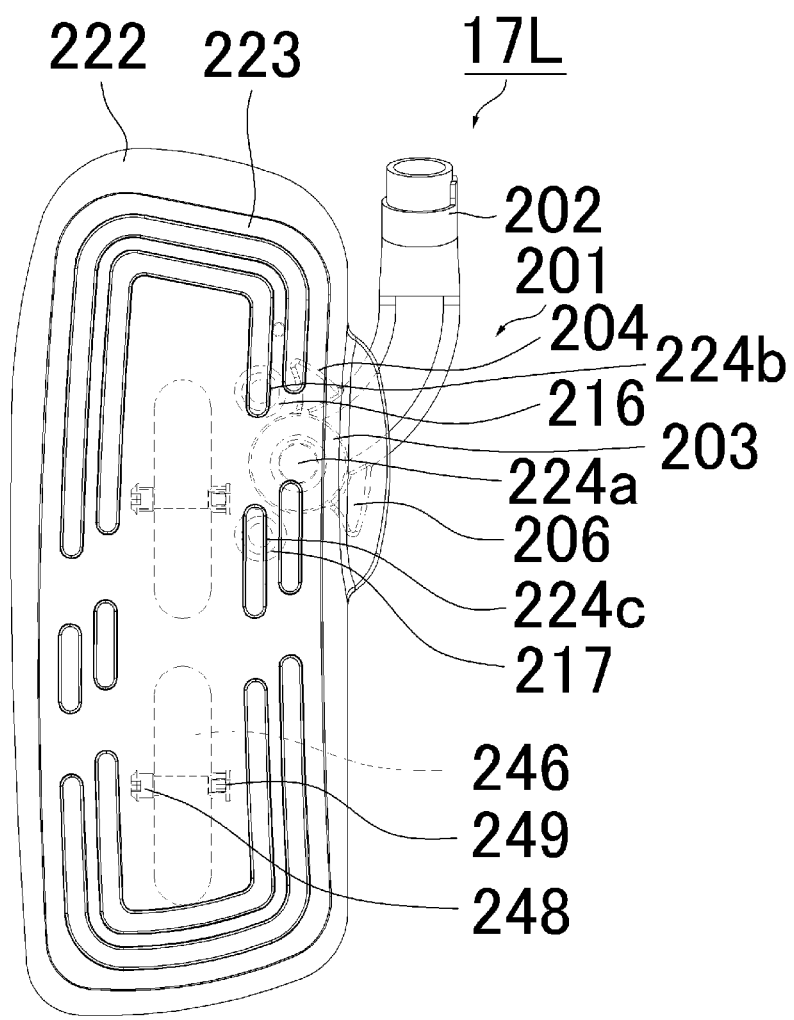
FIGS. 14 and 15 are views for illustrating an example of left and right pivoting of a left foot rest assembly of the tricycle kick board according to an embodiment of the present invention.
Figure 15:
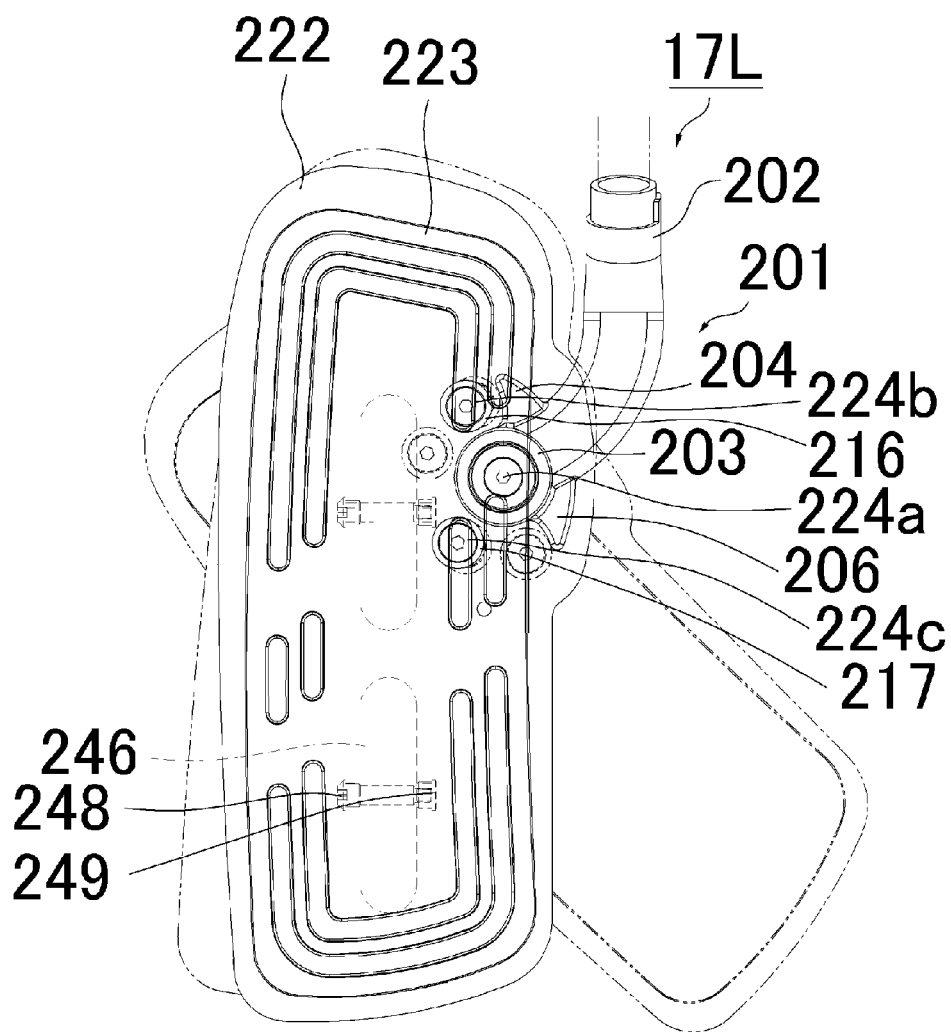

FIGS. 14 and 15 are views for illustrating an example of left and right pivotal movement of the left foot rest assembly on the tricycle kick board according to an embodiment of the present invention.

The left foot rest assembly and the right foot rest assembly of the tricycle kick board according to an embodiment of the present invention are disposed to be symmetrical to each other. Thus, the left and right foot rest assemblies according to an embodiment of the present invention may be described with reference to views of an example of the left foot rest assembly for describing convenience.

As shown in FIGS. 11 through 15, the left and right foot rest assemblies 17L and 17R according to an embodiment of the present invention includes a pair of left and right direction pivoting units 201, a pair of foot rest assemblies 221, and a pair of wheel units 241, etc.

The pair of left and right direction pivoting units 201 are connected with the left and right moving frames 16L and 16R, respectively. In detail, each of the left and right direction pivoting units 201 includes a connecting frame 202, a first stopper protrusion 204, a second stopper protrusion 206, a first stopper member 216, a second stopper member 217, a securing bracket 218, etc.

Here, the connecting frames 202 are connected to the left and right moving frames 16L and 16R, respectively. Each of the connecting frames 202 is secured between a non-slip member 223 of the foot rest assembly 221 and a second foot rest plate 225 by a pivot shaft 224a which is inserted into a connecting frame hole 203 and fastened.

Here, the pivot shaft 224a may be coupled with first and second bearings 213 and 215.

The first and second bearings 213 and 215 allow the foot rest assembly 221 to be more rigidly supported and to have higher coupling degree with the connecting frame 202, whereby the connecting frame 202 can efficiently be rotated.

The first stopper protrusion 204 and second stopper protrusion 206 are formed on both side of the connecting frame 202 at points adjacent to the pivot shaft 224a.

Also, the first and second stopper members 216 and 217 are disposed to be placed between the non-slip member 223 of the foot rest assembly 221 and the second foot rest plate 225 and spaced apart from the pivot shaft 224a.

Here, the first and second stopper members 216 and 217 are secured by first and second supplementary pivot shafts 224b and 224c inserted therein.

These first and second stopper members 216 and 217 are selectively bumped to and stopped by the first and second stopper protrusions 204 and 206 depending on pivotal directions of the foot rest assembly 221.

Here, the first and second stopper members 216 and 217 are preferably made of urethane soft rubber.

The securing bracket 218 is disposed below the second foot rest plate 225 in such a manner that the pivot shaft 224a and the first and second supplementary pivot shafts 224b and 224c are threadedly fastened by first and second fastening bolts 219 and 220.

The foot rest assembly 221 is disposed to surround the left and right direction pivoting unit 201 and is pivoted by the left and right direction pivoting unit 201 in left and right directions.

The foot rest assembly 221 includes a first foot rest plate 222, the non-slip member 223, the second foot rest plate 225, etc.

The first foot rest plate 222 receives the rider's foot put thereon. Especially, the non-slip member 223 is disposed under the first foot rest plate 222 so as to prevent the rider's foot from slipping.

The second foot rest plate 225 is disposed under the non-slip member 223 and is coupled with the first foot rest plate 222 while surrounding the first foot rest plate 222.

Here, the first foot rest plate 222 and the non-slip member 223 include coupling slots 222a and coupling protrusions 223a adapted for being coupled together, respectively. The first foot rest plate 222, the non-slip member 223, and the second foot rest plate 225 may be fixedly coupled together by third and fourth fastening bolts 225 and 226.

The wheel unit 241 is disposed under the foot rest assembly 221 and includes first and second wheel connecting frames 242 and 244, wheels 246, and a brake unit 250, etc.

The first and second wheel connecting frames 242 and 244 are disposed under the second foot rest plate 225 to be spaced apart from each other. The wheels 246 which are two or more are disposed between the first wheel connecting frame 242 and the second wheel connecting frame 244 and fastened by fastening means 247, 248, and 249.

The brake unit 250 is disposed between the first wheel connecting frame 242 and the second wheel connecting frame 244. The brake unit 250 is installed to be spaced apart from the two or more wheels 246 so that it brakes one or more wheels of the two or more wheels 246.

In greater detail, the brake unit 250 includes a stopper 250a, a brake line collecting means 250b, a torsion spring 250c, a fastening pin 250d, etc., in which the stopper 250a is disposed to be between the first wheel connecting frame 242 and the second wheel connecting frame 244 and to be spaced apart from the two or more wheels 246 and brakes one or more wheels 246.

Here, the brake line collecting means 250b for collecting a brake line is fastened by a fifth fastening bolt 251 to the front end of the stopper 250a and, beside the stopper 250a, the torsion spring 250c for restoring the stopper 250a to an original position thereof is fastened by the fastening pin 250d.

Hereinafter, the operation of the tricycle kick board 1 according to an embodiment of the present invention is explained.

The tricycle kick board 1 travels while the rider steps on the left and right foot rest assemblies 17L and 17R with both feet.

Especially, it gets driving force and travels forward when the rider applies force to the left foot rest assembly 17L or the right foot rest assembly 17R outward, just like pushing them outward, while moving the handle of the steering unit 14 in a zigzag, and therefore it travels just as the rider moves wearing inline skates or ice skates.

When the rider turns the steering unit 14, the pillar shaft 10 is pivoted in the main body 30 so that a change of direction of the tricycle kick board 1 is achieved.

Further, the left and right foot rest assemblies 17L and 17R are opened or closed depending on movement directions of the rider as shown in FIG. 5.

Especially, when the left foot rest assembly 17L or the right foot rest assembly 17R reaches the outermost limit or the innermost limit, the left frame 94L or the right frame 94R is blocked by a left buffer member 98L or a right buffer member and therefore cannot be opened or closed anymore.

Especially, as shown in a detailed drawing of FIG. 5, a first inner wall 97a or a second inner wall 97 on the opposite side compresses the left buffer member 98L or the right buffer member 98R and, at the same time, absorbs shocks.

On the other hand, as shown in FIG. 5, the first and second shafts 103a and 103b which are the respective pivots of the left and right frames 94L and 94R are disposed more forward than the center of the pillar shaft 10, and the supplementary body 70 is mounted at the rear of the main body 30.

That is, a radius of angular motion of the left foot rest assembly 17L or the right foot rest assembly 17R can be formed to be bigger than that of conventional tricycle kick boards with similar size, whereby the tricycle kick board 1 of the present invention can travel more stably.

In addition, as shown in FIGS. 3, 9, and 10, the left and right frames 94L and 94R mounted to the supplementary body 70 are configured such that, when the front end of the left frame 94L goes down, the front end of the right frame 94R opposed thereto always goes up.

In order to develop driving force of the tricycle kick board 1 in travelling, the rider repeats motions just like pushing the ground left outward and right outward while shifting his weight left and right. At this time, one of the foot rest assemblies (the left or right foot rest assembly) on which the rider's weight is not loaded is spaced off from the ground for an instant, so that no friction against the ground is produced.

According to the tricycle kick board 1 of an embodiment of the present invention as mentioned above, one of the foot rest assemblies where the rider's weight is not loaded on, for example, the right foot rest assembly 17R (if the rider's weight is loaded on the left foot rest assembly 17L) is lifted off the ground so as not to be contacted with the ground.

The height of the right foot rest assembly 17R being lifted off the ground will be dependent on the skill of the rider.

Since unnecessary frictional resistance from the ground can be minimized when driving force is developed in travelling, a faster speed can be achieved.

In addition, the lifting of one of the foot rest assemblies (the left foot rest assembly or the right foot rest assembly) can be understood to mean that the supplementary body 70 is angularly rotated from the main body 30. At this time, the rotation of the supplementary body 70 is not unlimited but will be limited by stresses of the upper right compression spring 93TR, the upper right compression spring 93TL, the lower right compression spring 93BR, and the lower left compression spring 93BL which are disposed between the supplementary body 70 and the upper body 50 or between the supplementary body 70 and the lower body 40.

On the other hand, when the compression springs are disposed in all the upper and lower positions and all the left and right positions as shown FIG. 3, a pair of the compression springs diagonally disposed relative to each other in reference to the main shaft 101 are simultaneously compressed and restored and can actively cope with the operations, thereby allowing stable travel of the tricycle kick board 1.

On yet another hand, when the compression springs are disposed in the upper left and right positions or in the lower left and right positions as shown in FIG. 9 or 10, the configuration of the joint unit 20 can be simplified whereby the manufacturing cost can be reduced.

On yet another hand, since the left and right foot rest assemblies can be pivoted left and right as shown in FIGS. 14 and 15, the rider can obtain driving force and move forward by applying force to them just like pushing the ground outward, so that he can arrive at his destination while minimizing the quantity of motion.

Those skilled in the art will appreciate that the present invention can be implemented as other embodiments, without departing from the technical spirit and essential features of the invention, so that the above embodiments are only exemplary, and are not limiting. The scope of the present invention is defined by the accompanying claims rather than the detailed description. All changes or modifications that can be derived from the meaning and scope of the claims and equivalent concepts thereof should be interpreted as being included in the scope of the present invention.

The invention claimed is:

1. A tricycle kick board comprising:
a pillar shaft having a front wheel rotatably mounted to a lower portion thereof;
a steering unit mounted to an upper portion of the pillar shaft;
a joint unit disposed on the pillar shaft; and
left and right moving frames connected at one portion thereof to the joint unit and at another portion thereof to left and right foot rest assemblies, respectively, each of the left and right foot rest assemblies having a wheel disposed thereunder,
wherein the joint unit comprises:

a main body fitted to the pillar shaft so as to be pivotable about the pillar shaft, the main body further including upper and lower bodies fitted to the pillar shaft and coupled to a top and bottom of the main body, respectively;

upper and lower bearings fitted to the pillar shaft and disposed above and below the upper and lower bodies, respectively; and upper and lower fastening nuts disposed above and below the upper and lower bearings, respectively, the upper and lower fastening nuts being fastening with the pillar shaft;

a main shaft fastened to a side of the main body; and a supplementary body pivotally mounted to the main body so as to be pivotable about the main body.

2. The tricycle kick board as claimed in claim 1, further comprising:

upper left and right compression springs mounted between the supplementary body and the upper body, the upper left and right compression springs being spaced apart from each other; and lower left and right compression springs mounted between the supplementary body and the lower body, the lower left and right compression springs being spaced apart from each other.

3. The tricycle kick board as claimed in claim 1, further comprising:

upper and lower pin holes formed on the top and bottom surfaces of the main body, respectively;

fastening guide protrusions disposed on a bottom surface of the upper body or on a top surface of the lower body and formed to correspond to the upper pin holes or the lower pin holes.

4. The tricycle kick board as claimed in claim 3, wherein the upper body or the lower body is provided with upper right and left braces or lower right and left braces which are disposed on both of left and right sides thereof.

5. The tricycle kick board as claimed in claim 4, wherein each of the lower right brace and the lower left brace is provided with a first spring guide protrusion, and each of the upper right brace and the upper left brace is provided with a second spring guide protrusion.

6. The tricycle kick board as claimed in claim 1, wherein the supplementary body comprises:

lower left and right support arms disposed on the left and right sides thereof, respectively;

upper left and right support arms disposed on the left and right sides thereof respectively, the upper left and right support arms being spaced apart from the lower left and right support arms;

third and fourth fastening holes formed in the upper left and right support arms, respectively; and seventh and eighth fastening holes formed in the lower left and right support arms, respectively, the seventh and eighth fastening holes corresponding to the third and fourth fastening holes.

7. The tricycle kick board as claimed in claim 6, wherein the left and right moving frames comprise:

thirteenth fastening holes each formed therein;

stopping jaws each formed therein and spaced apart from each of the thirteenth fastening holes;

receiving grooves each formed between each of the left and right moving frames and each of the stopping jaws;

a first shaft inserted and fastened into the third fastening hole, the seventh fastening hole, and one of the thirteenth fastening holes;

a second shaft inserted and fastened into the fourth fastening hole, the eighth fastening hole, and another of the thirteenth fastening holes; and left and right buffer members secured between the upper and lower right support arms or the upper and lower left support arms, the left and right buffer members being disposed within the receiving grooves, respectively.

8. The tricycle kick board as claimed in claim 6, further comprising:

a left seat recess and a right seat recess formed on a top surface or a bottom surface of the supplementary body, respectively.

9. The tricycle kick board as claimed in claim 8, further comprising:

a third spring guide protrusion or a fourth spring guide protrusion disposed in the left seat recess or the right seat recess.

10. The tricycle kick board as claimed in claim 6, wherein the supplementary body comprises:

upper left and right bases or lower left and right bases formed on the top surface or bottom surface thereof, respectively;

third spring guide protrusions disposed in the lower left and right bases respectively; and fourth spring guide protrusions disposed in the upper left and right bases, respectively.

11. The tricycle kick board as claimed in claim 1, wherein each of the left and right foot rest assemblies comprises:

a left and right direction pivoting unit connected thereto;

a foot rest unit disposed to surround the left and right direction pivoting unit, the foot rest unit being pivoted left and right by the left and right direction pivoting unit; and a wheel unit disposed under the foot rest unit.

12. The tricycle kick board as claimed in claim 11, wherein the foot rest unit comprises:

a first foot rest plate;

a non-slip member disposed under the first foot rest plate; and a second foot rest plate disposed under the non-slip member, the second foot rest plate being coupled with the first foot rest plate while surrounding the non-slip member.

13. The tricycle kick board as claimed in claim 12, wherein the left and right direction pivoting unit comprises:

a connecting frame connected to each of the left and right moving frames in which a pivot shaft of the connecting frame is fastened between the non-slip member and the second foot rest plate so as to rotate the foot rest unit;

first and second stopper protrusions disposed on both side portions of the connecting frame, the first and second stopper protrusions being adjacent to the pivot shaft;

first and second stopper members fastened between the non-slip member and the second foot rest plate and spaced apart from the pivot shaft, the first or second stopper member being contacted with and stopped by the first or second stopper protrusion depending on pivotal directions of the foot rest unit; and a securing bracket disposed under the second foot rest plate, the securing bracket fastening the pivotal shaft and the first and second stopper members.

14. The tricycle kick board as claimed in claim 13, wherein the first and second stopper members are made of urethane or soft rubber with a high friction co-efficient.

15. The tricycle kick board as claimed in claim 11, wherein the wheel unit comprises:

first and second wheel connecting frames disposed under the foot rest unit;

one or more wheels mounted between the first and second wheel connecting frames; and a brake unit disposed between the first and second wheel connecting frames and spaced apart from the one or more wheels so as to brake the wheels.

16. The tricycle kick board as claimed in claim 15, wherein the one or more wheels are directional caster wheels which are adapted to change direction by a certain degree when being applied with lateral force and to be restored to when the lateral force is removed.

* * * * *